July 13, 1965 S. F. ALLINA 3,193,997
GRASS CATCHER
Filed Feb. 11, 1963
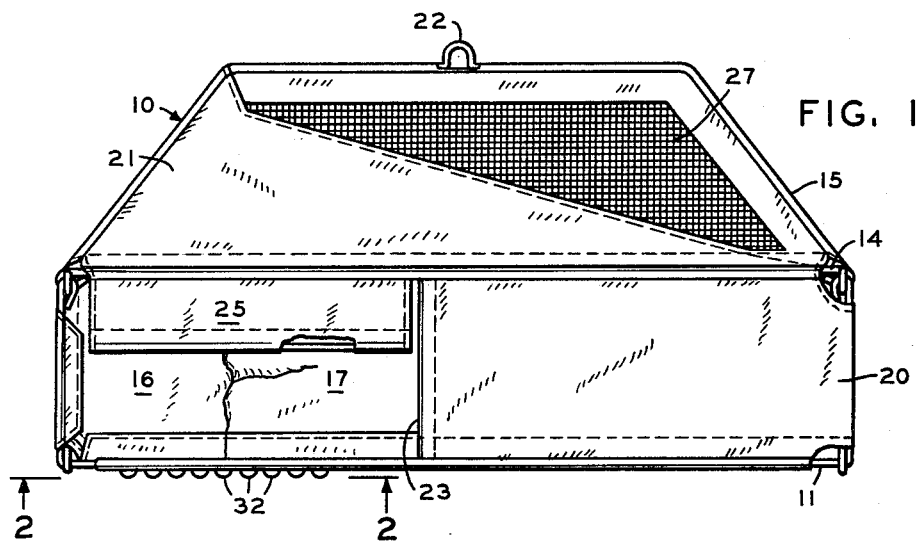
FIG. 1
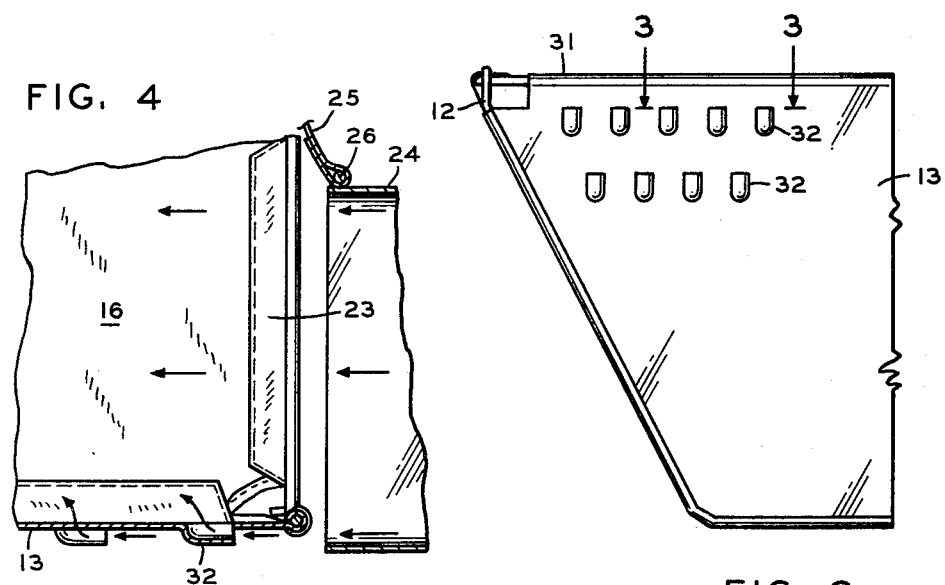
FIG. 4
FIG. 2
FIG. 3
INVENTOR
STANLEY F. ALLINA
BY Cohn and Powell
ATTORNEYS

United States Patent Office 3,193,997
Patented July 13, 1965

---

3,193,997
GRASS CATCHER
Stanley F. Allina, St. Louis, Mo., assignor to The Perfection Manufacturing Company, St. Louis, Mo., a corporation of Missouri
Filed Feb. 11, 1963, Ser. No. 257,435
8 Claims. (Cl. 56—202)

This invention relates generally to improvements in a grass catcher, and more particularly to an improved device of this type adapted for use with a rotary power mower.

An important object is to provide a grass catcher that is adapted to coact with a rotary power mower having a housing provided with a lateral discharge opening.

Another important objective is achieved by the provision of ports in the bottom wall of the container and in the path of the air stream from the mower discharge chute, a portion of the discharge air stream moving underneath the bottom wall and flowing upwardly through the ports to lift the grass clippings upon entrance to the container and passage over such ports. This action causes the clippings to pack more efficiently and compactly toward the rear of the container and precludes any premature blockage at the container entrance or at the mower chute.

Yet another important object is realized by the provision of guide means depending from the bottom wall adjacent to the ports for directing the air stream below the bottom wall into and through such ports, and thereby providing for a more effective lifting action on the grass clippings.

Other important advantages are afforded by depressing areas of the bottom wall in order to form scoops about the port, such scoops being arranged and oriented in a direction toward the discharge air stream so as to collect the minor portion of the air stream below the bottom wall most efficiently.

An important object is provided by arranging the plurality of ports in the bottom wall in spaced relation in laterally offset rows so that all of the ports are disposed directly in the path of the air flow from the discharge chute.

Another important objective is achieved by the provision of a container having a front wall in which an intake opening is located, the intake opening being aligned with the mower chute. The ports in the bottom wall are located adjacent to air intake opening and in the path of the air stream discharged from the lawn mower over the bottom wall. In positioning the container, the bottom wall is disposed so that a main portion of the air stream is discharged from the chute into the container above the bottom wall while a relatively minor portion of the air stream is discharged below such bottom wall. The ports utilize the energy of the minor portion of the air stream, that would otherwise be lost, to lift the grass clippings in their travel to the rear of the container.

It is an important object to provide a grass catcher that is simple and durable in construction, economical to manufacture and assemble, highly efficient in operation, and which can be easily utilized by any one without any instruction.

The foregoing and numerous other objects and advantages of the invention will more clearly appear from the following detailed description of a preferred embodiment, particularly when considered in connection with the accompanying drawing, in which:

FIG. 1 is a front elevational view of the grass catcher;

FIG. 2 is an enlarged fragmentary, bottom plan view of the bottom wall of the container as seen along line 2—2 of FIG. 1;

FIG. 3 is an enlarged cross sectional view of the ports and associated scoops as seen along line 3—3 of FIG. 2, and FIG. 4 is a fragmentary cross sectional view showing the relative positioning of the catcher with the air discharge chute of a mower housing.

Certain of the features of the present assembly are disclosed and claimed in U.S. Patent No. 2,970,421, issued February 7, 1961, and entitled "Grass Catcher."

The grass catcher generally indicated at 10 consists of a box-like container that is detachedly fastened to the mower housing in a conventional manner as suggested in the above identified patent. The catcher 10 includes a substantially U-shaped front frame 11 and a second U-shaped bottom frame 12 hingedly connected to the bottom of front frame 11. A metal plate 13 constituting the bottom wall, bridges the bottom frame 12. A rod 14 extends between and interconnects the upper free ends of the U-shaped front frame 11.

Another U-shaped frame 15 is hingedly connected to the top of the front frame 11 and extends rearwardly above the bottom wall 13. A canvas covering is secured to and extends between the bottom frame 13 and the U-shaped frame 15 so as to provide side walls 16 and rear wall 17. Furthermore, a canvas covering extends over the front frame 11 to provide a front wall 20. It will be particularly noted that the side walls 16 converge rearwardly from the ends of the front frame 11 to the rear wall 17 as is best seen in FIG. 1.

The top wall 21 of the container 10 is provided by a canvas covering over the U-shaped frame 15. Frame 15 is provided with an exposed loop 22 at the rear of the container, such loop 22 receiving some supporting element incident to attachment of the catcher to the mower housing.

It is preferred that the depth of the catcher 10 be greater at the rear than the depth at the front, as is seen in FIG. 1.

The front wall 20 of the catcher 10 is provided with an intake opening 23 at one end of the front wall. When the catcher 10 is attached to its supporting mower housing bracket, the intake opening 23 is aligned with the discharge opening or chute 24 of the mower housing, as is suggested in FIG. 4. The chute 24 discharges the grass clippings in an air stream through the intake opening 23 and into the container 10.

A canvas flap 25 having a weight 26 sewed into its lower margin, extends downwardly into the intake opening 23, the flap 25 being adapted to engage the top of the discharge chute 24. The flap 25 thus provides a more effective air seal and accommodates the intake opening 23 for discharge chutes 24 of various sizes depending upon the make and model of the lawn mower.

The top wall 21 is provided with a substantially triangular air outlet opening 27 at the rear corner of the catcher diagonally opposite the intake opening 23.

The bottom wall 13 of the container is provided with a plurality of ports 30 arranged close to the front margin 31 of the bottom wall 13 just inside of the intake opening 23. These ports are arranged in regularly spaced offset rows as is best seen in FIG. 2. These ports 30 are preferably formed by cutting and depressing a small area of the bottom wall 13 so that such depressions form scoops 32 oriented in a direction toward the air stream from the lawn mower chute 24. The scoops 32 catch that portion of the air stream moving underneath the bottom wall 13 and serve to guide and direct the captured air stream upwardly through the ports 30 so as to lift the grass clippings above the bottom wall upon passage over the ports 30 as the air stream is discharged into the container. It will be understood that the "openings" in the bottom wall 13 are the "ports" 30 and that the depressed scoops 32 merely serve to guide the air through the ports 30 into the container.

It is thought that the usage and functional advantages of the grass catcher have become fully apparent from the foregoing detailed description of parts, but for completeness of disclosure the mounting and operation will be briefly described. It will be assumed that the catcher 10 is attached to the mower housing in the conventional manner such as that disclosed in U.S. Patent No. 2,970,421. When so mounted, the discharge chute 24 is aligned directly with the intake opening 23, the flap 25 engaging the top of the chute to form a more effective seal. The bottom wall 13 of the container 10 is disposed relative to the chute 24 so that the major portion of the air stream is discharged through the intake opening 23 into the container and over the bottom wall, while only a very minor portion of the air stream is discharged below the bottom wall 13.

In usage, the grass clippings are discharged through the housing chute 24, through the catcher intake opening 23 and into the enclosure of the catcher 10. The clippings and the air stream discharge substantially tangentially with the side wall 16 immediately adjacent the intake opening 23 so that the stream curves naturally along the side wall 16 and the rear wall 17 in a substantially arcuate path with a minimum of turbulence. The air outlet opening 27 in the top wall 21 permits the escape of air from the container and causes the clippings to be deposited first at the right hand side of the enclosure until it is filled up to the intake opening 23.

To provide for a more efficient packing of the catcher 10 and for a more effective movement of the grass clippings in its movement into the container, effective use is made of the minor portion of the air stream flowing underneath of the bottom wall 13. It will be understood that the scoops 32 capture this minor portion of the air stream flowing below the bottom wall 13 and direct such minor portion of the air stream upwardly through the ports 30 so as to lift the grass clippings upon their entrance into the container 10 as they pass over the ports 30. This lifting action assures that the grass clippings will travel completely to the rear right hand side of the container 10, and thereby preclude any premature blockage of the intake opening 23.

Although the invention has been described by making detailed reference to a single preferred embodiment, such detail is to be understood in an instructive, rather than in any restrictive sense, many variants being possible within the scope of the claims hereunto appended.

I claim as my invention:

1. A grass catcher comprising:
   (a) a container having a bottom wall,
   (b) said bottom wall being provided with ports disposed so that air with grass clippings from the air discharge opening of a lawn mower passes over such ports, and
   (c) guide means on the bottom wall adjacent said ports for directing air below the bottom wall into and through said ports, such air lifting the grass clippings above the bottom wall upon passing over said ports.

2. A grass catcher comprising:
   (a) a container having a bottom wall with a front margin,
   (b) said bottom wall being provided with ports located close to the front margin of the bottom wall and disposed so that air with grass clippings from the air discharge opening of a lawn mower passes over such ports, and
   (c) guide means on the bottom wall adjacent said ports oriented in a direction toward the air discharge stream for directing air below the bottom wall into and through said ports to lift the grass clippings upon entrance to the container.

3. In a grass catcher and mower housing:
   (a) a mower discharge chute for discharging grass clippings in an air stream,
   (b) a container having a bottom wall disposed relative to said chute so that a main portion of the air stream is discharged from the chute into the container above the bottom wall while a minor portion of the air stream is discharged below the bottom wall,
   (c) said bottom wall being provided with ports disposed in the path of said air stream, and
   (d) scoops depending from said bottom wall and oriented in the direction toward said air stream for directing the minor portion of said air stream below the bottom wall into and through said ports to lift the grass clippings in the main portion of the air stream above the bottom wall.

4. In a grass catcher and lawn mower housing:
   (a) a mower discharge chute for discharging grass clippings in an air stream,
   (b) a container having a bottom wall with a front margin, said bottom wall being disposed relative to said chute so that a main portion of the air stream is discharged from the chute into the container above the bottom wall while a minor portion of the air stream is discharged below the bottom wall,
   (c) said bottom wall being provided with a plurality of spaced ports arranged in relatively offset rows close to the front margin of the bottom wall and in the path of said air discharge stream,
   (b) the bottom wall including scoops depending from the bottom wall next to said ports, said scoops being oriented in the direction toward said air discharge stream for directing the minor portion of the air stream below the bottom wall into and through said ports to lift the grass clippings passing over the ports upon entrance to the container.

5. In a grass catcher and a mower housing:
   (a) an air discharge chute discharging grass clippings in an air stream,
   (b) a container having a bottom wall with a front margin, said bottom wall being disposed relative to said chute so that a main portion of the air stream is discharged from the chute into the container above the bottom wall while a minor portion of the air stream is discharged below the bottom wall,
   (c) side and rear walls extending upwardly from said bottom wall,
   (d) a front wall extending upwardly from said front margin, said front wall being provided with an intake opening aligned with said chute to receive said air stream,
   (e) said bottom wall being provided with a plurality of ports adjacent the said intake opening and in the path of the air stream, and
   (f) guide means on the bottom wall adjacent said ports for directing the minor portion of the air stream below the bottom wall into and through said ports to lift the grass clippings above the bottom wall upon passage over said ports.

6. In a grass catcher and mower housing as defined above in claim 5, but further characterized in that:
   (g) the said guide means comprises scoops depending from the bottom wall next to said ports, said scoops being oriented in a direction of the said air stream.

7. In a grass catcher and mower housing as defined above in claim 6, but further characterized in that:
   (h) the said ports and associated scoops are arranged in spaced relation in offset rows to more effectively receive the minor portion of said air stream.

8. A grass catcher comprising:
   (a) a container having a bottom wall with a front margin,
   (b) side and rear walls extending upwardly from the bottom wall, (c) a front wall extending upwardly from the front margin, the front wall being provided with an intake opening,
(d) a top wall provided with an outlet opening,
(e) the bottom wall being provided with a plurality of ports adjacent the intake opening and in the path of the air and grass clippings discharged over the bottom wall in the movement toward the outlet opening, the ports being located close to the front margin of the bottom wall, and
(f) guide means on the bottom wall adjacent the ports directing air below the bottom wall into and through the ports to lift the grass clippings above the bottom wall upon passage over the ports.

References Cited by the Examiner
UNITED STATES PATENTS

| | | | |
|---|---|---|---|
| 2,855,744 | 10/58 | Phelps | 56—202 |
| 2,970,421 | 2/61 | Krewson | 56—202 |

T. GRAHAM CRAVER, *Primary Examiner.*

RUSSELL R. KINSEY, *Examiner.*